United States Patent
Wu et al.

(10) Patent No.: US 7,533,862 B2
(45) Date of Patent: May 19, 2009

(54) COUPLING MECHANISM FOR SECURING AUDIO/VIDEO PLAYER ONTO FLAT PANEL DISPLAY

(75) Inventors: Chun-Ting Wu, Hsinchu (TW); Cheng-Fu Lee, Hsinchu (TW)

(73) Assignee: Lite-On It Corp., Taipei (TW)

( * ) Notice: Subject to any disclaimer, the term of this patent is extended or adjusted under 35 U.S.C. 154(b) by 729 days.

(21) Appl. No.: 11/113,255

(22) Filed: Apr. 22, 2005

(65) Prior Publication Data
US 2005/0258333 A1    Nov. 24, 2005

Related U.S. Application Data

(63) Continuation-in-part of application No. 11/069,462, filed on Mar. 1, 2005, now abandoned.

(30) Foreign Application Priority Data
Apr. 30, 2004 (TW) ............................. 93112248 A (51) Int. Cl.
  *B41J 11/02* (2006.01)
(52) U.S. Cl. ..................... 248/442.2; 248/918
(58) Field of Classification Search ............. 248/442.2, 248/324, 474, 479, 291.1, 318, 918, 339, 248/304; 403/164, 165, 329
See application file for complete search history.

(56) References Cited

U.S. PATENT DOCUMENTS

| | | | | | |
|---|---|---|---|---|---|
| 4,960,257 | A | * | 10/1990 | Waters | 248/442.2 |
| 5,082,235 | A | * | 1/1992 | Crowther et al. | 248/231.41 |
| 5,687,945 | A | * | 11/1997 | Lee | 248/442.2 |
| 5,732,924 | A | * | 3/1998 | Hegarty et al. | 248/442.2 |
| 6,173,936 | B1 | * | 1/2001 | Hegarty | 248/442.2 |
| 6,399,883 | B1 | * | 6/2002 | Lhota | 174/101 |
| 7,226,028 | B2 | * | 6/2007 | Lin | 248/291.1 |
| 7,296,774 | B2 | * | 11/2007 | Oh | 248/324 |
| 2003/0173483 | A1 | * | 9/2003 | Yeh | 248/287.1 |
| 2005/0072886 | A1 | * | 4/2005 | Adams | 248/301 |
| 2005/0127253 | A1 | * | 6/2005 | Kim | 248/176.1 |

* cited by examiner

*Primary Examiner*—Ramon O Ramirez
(74) *Attorney, Agent, or Firm*—Kirton & McConkie; Evan R. Witt (57) ABSTRACT

A coupling mechanism for securing an audio/video player onto a flat panel display includes a casing, a hanger assembly and a connection member. The casing is used for supporting the audio/video player in an upright manner. The hanger assembly is attachable to the flat panel display. The connection member rotatably couples the casing to the hanger assembly so that an orientation of the audio/video player relative to the flat panel display is adjustable.

18 Claims, 14 Drawing Sheets

COUPLING MECHANISM FOR SECURING AUDIO/VIDEO PLAYER ONTO FLAT PANEL DISPLAY

CROSS REFERENCE TO RELATED PATENT APPLICATION

This patent application is a continuation-in-part (CIP) application of a U.S. patent application Ser. No. 11/069,462 filed Mar. 1, 2005 now abandoned. The contents of the related patent applications are incorporated herein for reference.

FIELD OF THE INVENTION

The present invention relates to a coupling mechanism, and more particularly to a coupling mechanism for securing an audio/video player such as a DVD player onto a flat panel display.

BACKGROUND OF THE INVENTION

Figure 1A:
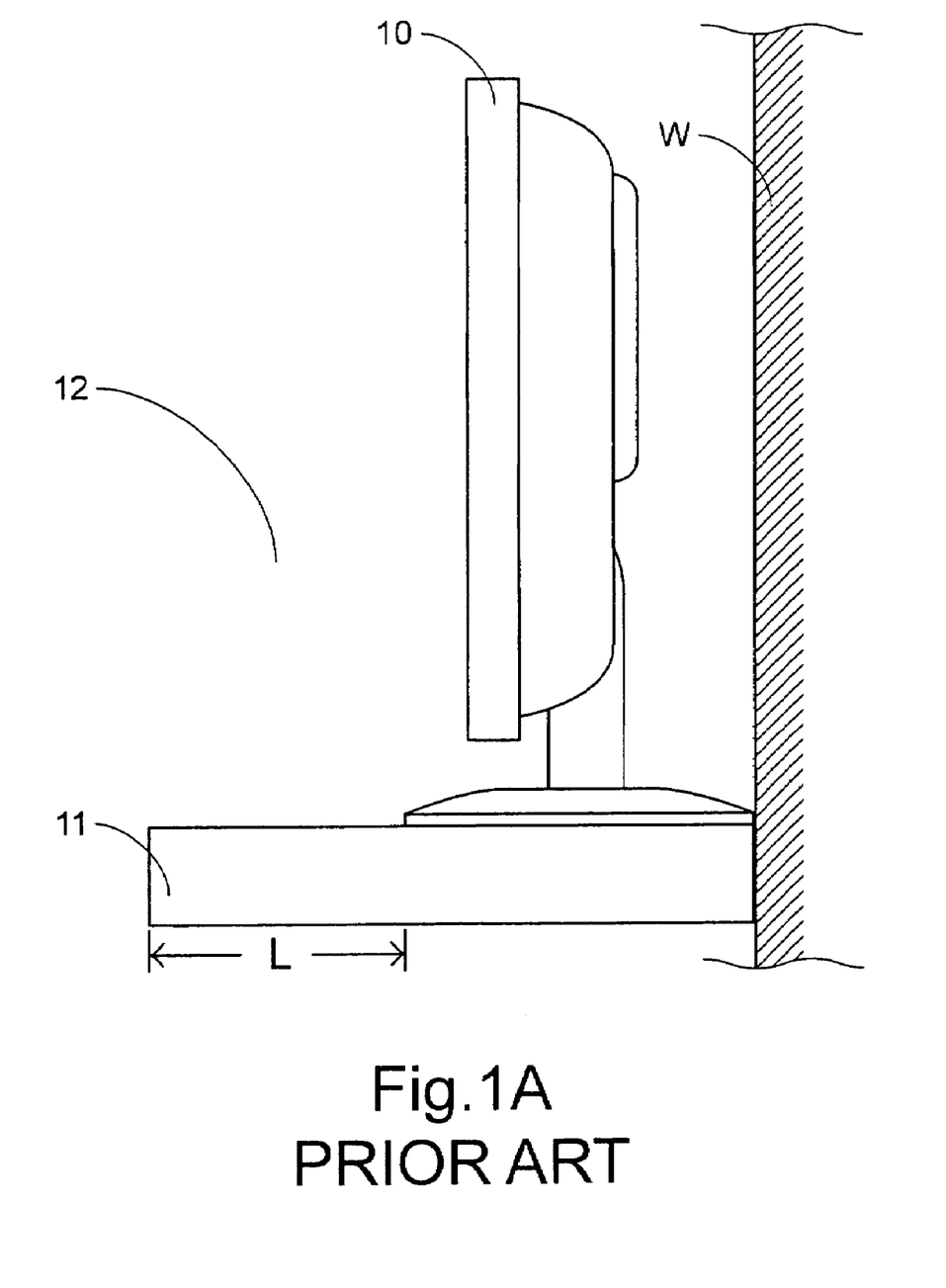
FIG. 1A is a schematic diagram showing conventional collocation of an audio/video equipment.

General collocation of a DVD player or similar audio/video player is to lie on a platform together with a flat panel display electrically connected thereto. FIG. 1A is one of the typical examples of the collocation. The DVD player 11 is put on a desk (not shown) and adjacent to a wall W. The flat panel display 10 rests on the top of the DVD player 11. Although certain space can be saved by resting the flat panel display 10 on the top of the DVD player 11, the unused space 12 resulting from the extensive portion L of the DVD player 11 from the flat panel display 10 is still adverse to space utilization.

For making use of the desk space, miniature DVD players were developed. A flat panel display, however, cannot rest on such a small DVD player, so exclusive spaces for respectively resting the DVD player and the flat panel display on the desk are still required. The space utilization is thus not much improved.

Figure 1B:
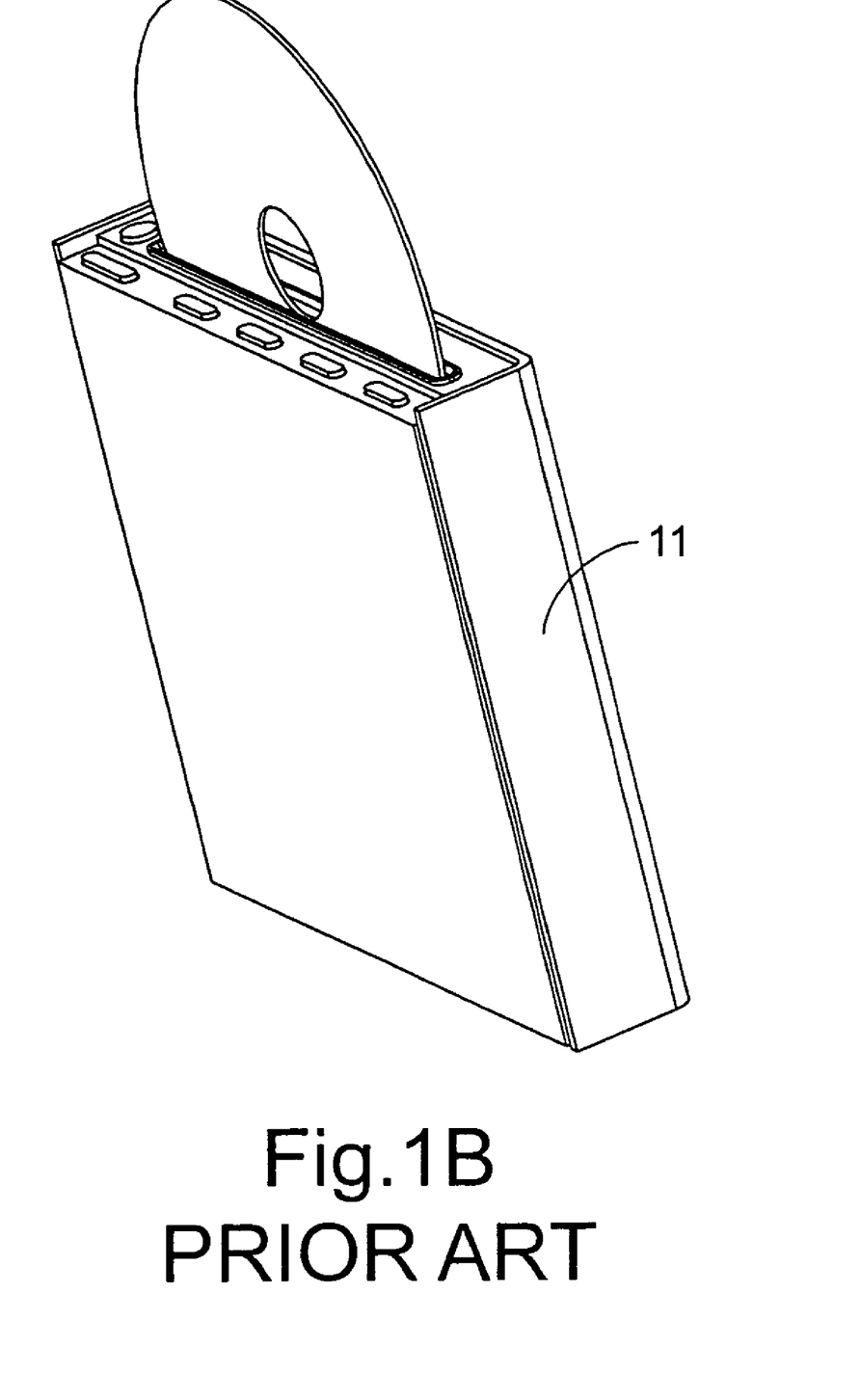
FIG. 1B is a schematic diagram showing an upright DVD player.

For further improving the space utilization, the DVD players can be made upright, as shown in FIG. 1B. Unfortunately, it is difficult for a small uptight DVD player to stand well on the desk, and the DVD player may subject to fall.

Figure 2:
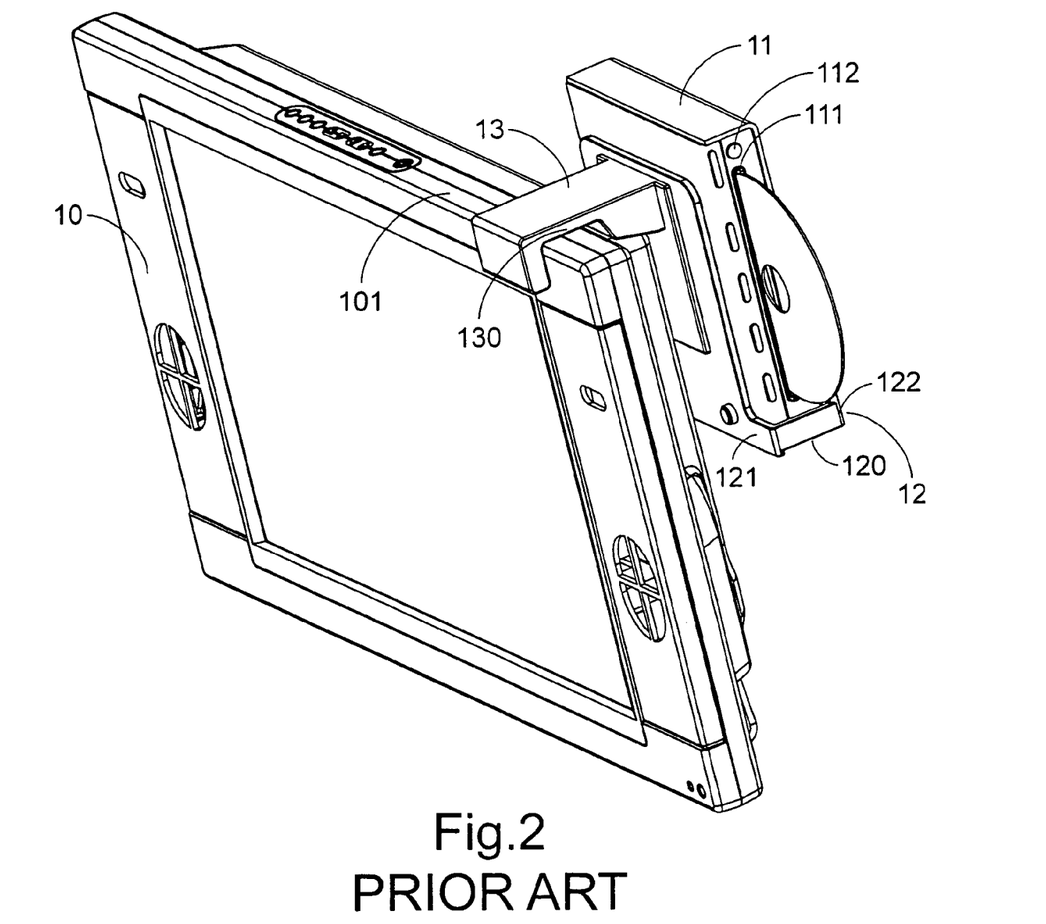
FIG. 2 is a schematic diagram showing a coupling device according to the parent application.

For further enhancing the space utilization, an improved collocation is suggested in the parent US patent application. By means of a coupling mechanism, the DVD player 11 can be made upright and attached to the flat panel display 10, as shown in FIG. 2. The coupling mechanism comprises a chassis 12 for accommodating therein the DVD player 11 and a hanger 13 attached to the chassis 12 for securing the chassis 12 to the top edge 101 of the flat panel display 10. The chassis 12 has two upright side plates 121 and 122 extending from a bottom plate 120 thereof. The hanger 13 is attached to the side plate 121 of the chassis 12 and has a hook structure 130.

When the DVD player 11 is clamped between the side plates 121 and 122 and the assembly is mounted to the flat panel display 10, the disc entrance 111 and push buttons 112 is exposed from the chassis 12 and faces rightwards, as shown in FIG. 2. Unfortunately, the optical disc sometimes needs to be inserted and ejected in a different direction due to the spatial limitation. For example, when the optical disc can only be inserted from the top surface of the DVD player 11, the disc entrance 111 should face upwards. If there is no problem that the disc entrance 111 faces rightwards at first but situation changes later, the DVD player 11 need be moved out from the chassis 12, tuned to have the disc entrance 111 face upwards and then put into the chassis 12 again. It would be troublesome for some users.

SUMMARY OF THE INVENTION

Therefore, the present invention provides a coupling mechanism for allowing a DVD player attached onto the flat panel display to adjust orientation thereof so as to facilitate insertion/ejection operation.

In accordance with a first aspect of the present invention, there is provided a coupling mechanism for securing an audio/video player onto a flat panel display. The coupling mechanism comprises a casing, a hanger assembly and a connection member. The casing is used for supporting the audio/video player in an upright manner. The hanger assembly is attachable to the flat panel display. The connection member rotatably couples the casing to the hanger assembly so that an orientation of the audio/video player relative to the flat panel display is adjustable.

In an embodiment, the connection member is securely coupled to the hanger assembly by a first portion thereof and rotatably coupled to the casing by a second portion thereof. The first portion of the connection member could be screwed to a side wall of the hanger assembly. And the second portion of the connection member could have a first fixture element rotatably engaging with a second fixture element arranged on the casing.

In an embodiment, the first portion and the second portion of the connection member are integrally formed so that the first portion and the hanger assembly rotate with the second portion when the first fixture element rotates relative to the second fixture element, thereby orienting the audio/video player differentially relative to the flat panel display. The first fixture element is a perforation created in the second portion, and the second fixture element is a tenon member with a hook structure for hooking on a wall edge of the perforation so as to retain the flexible post member inside the perforation. The tenon member includes a plurality of rigid posts and resilient posts alternately arranged and protruding from a surface of the casing in parallel, and each of the resilient posts has one end fixed on the casing and the other end being a hooked free end.

In an embodiment, the hanger assembly has a hook structure for hooking on an edge of the flat panel display. The hook structure has a first separable portion with a lateral trench structure and a second separable portion with a lateral protrusion structure matching with the lateral trench structure. The first and second separable portions of the hook structure further have saw-toothed and resilient structures movably engaging with each other when the lateral protrusion structure slides along the lateral trench structure, thereby allowing an extensive length of the hook structure to be adjusted according to the thickness of the flat panel display.

In an embodiment, the connection member further comprises a plurality of retaining holes discretely arranged around the perforation for selectively engaging with a salient arranged on the casing so as to secure relative positions of the connection member and the casing once the orientation of the audio/video player relative to the flat panel display has been determined.

In an embodiment, the casing further comprises a hook structure disposed at the same side as the second fixture element and matching with a protruding edge of the connection member, and the protruding edge is elongated and sliding through the hook structure when the first fixture element rotates relative to the second fixture element. The protruding edge of the connection member comprises first and second stop blocks. The first stop block is disposed at a first end thereof for stopping the hook structure from escaping from the first end of the protruding edge. The second stop block is disposed at a second end thereof and having a resilient hooked free end. The resilient hooked free end has a tapered structure for allowing the hook structure of the casing to hook on the protruding edge from the second end but stops the hook structure from escaping from the second end of the protruding edge.

The casing could be a chassis and a plurality of side plates extending from the chassis to form a room therebetween for receiving the audio/video player. The casing could also be a housing of the audio/video player.

In accordance with a second aspect of the present invention, there is provided a coupling mechanism for mounting an audio/video player to a flat panel display. The coupling mechanism comprises a casing, a hanger assembly and a connection member. The casing is used for supporting the audio/video player in an upright manner. The hanger assembly has a hook structure for hooking on an edge of the flat panel display. The hook structure comprises first and second separable portions having first and second engaging elements movably engaging with each other to allow an extensive length of the hook structure to be adjusted according to the thickness of the flat panel display. The connection member is used for rotatably coupling the casing to the hanger assembly therevia so that an orientation of the audio/video player relative to the flat panel display is adjustable. The first and second engaging elements are saw-toothed and resilient structures, respectively.

In an embodiment, the connection member has a first fixture element rotatably engaging with a second fixture element arranged on the casing. The connection member could further comprises a plurality of retaining holes discretely arranged around the perforation for selectively engaging with a salient arranged on the casing so as to secure relative positions of the connection member and the casing once the orientation of the audio/video player relative to the flat panel display has been determined.

The above contents of the present invention will become more readily apparent to those ordinarily skilled in the art after reviewing the following detailed description and accompanying drawings, in which:

DETAILED DESCRIPTION

Figure 3A:
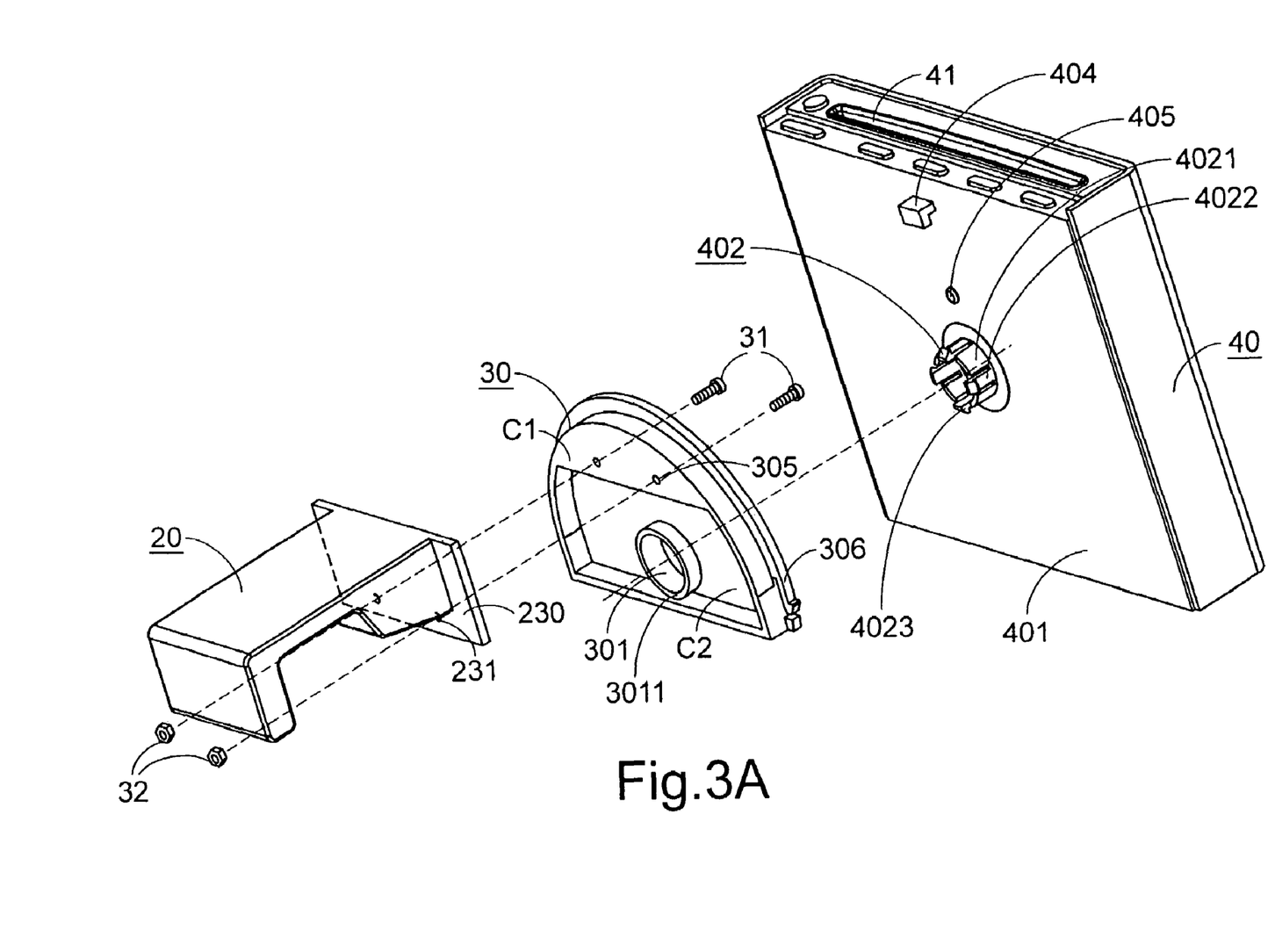
FIG. 3A is a schematic resolving diagram showing an embodiment of a coupling mechanism according to the present invention.
Figure 3B:
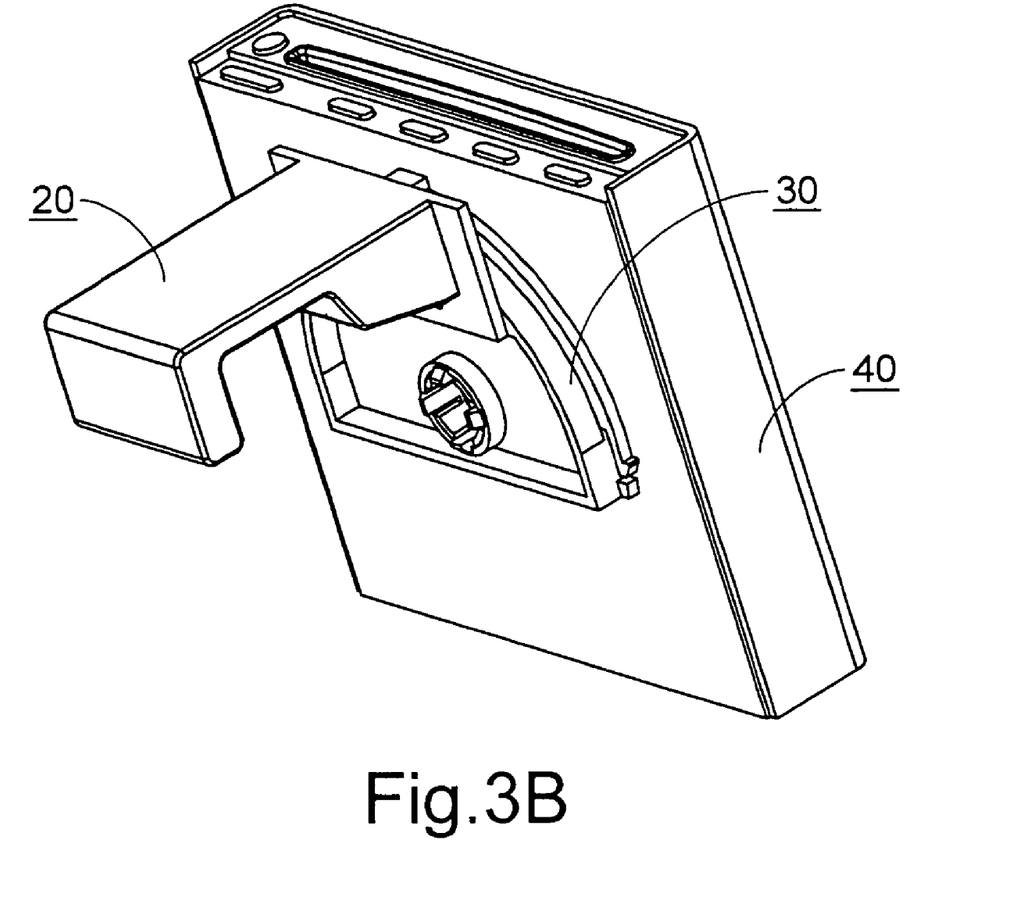
FIG. 3B is a schematic perspective diagram of the coupling mechanism of FIG. 3A.

Referring to FIGS. 3A and 3B, a coupling mechanism for securing an audio/video player such as a DVD player onto a flat panel display according to an embodiment of the present invention is shown.

For securing the DVD player to the flat panel display, the coupling mechanism includes a hanger assembly 20 to hook on an edge of the flat panel display. The DVD player has a disc entrance 41 for receiving or exiting a disc (not shown) therefrom. After the DVD player is attached to the flat panel display, it is desired that the disc entrance 41 orients a direction that the insertion and ejection of the disc can be easily done. In other words, it is preferred that the orientation of the DVD player relative to the flat panel display can be changed as required. In order to achieve this purpose, the coupling mechanism further includes a connection member 30 to facilitate the rotation. The back surface 401 of the casing 40 of the DVD player is arranged with a tenon member 402. The tenon member 402 includes a plurality of rigid posts 4021 and resilient posts 4022 alternately arranged and protruding from the back surface 401 of the casing 40 in parallel. Each of the resilient posts 4022 has one end fixed on the back surface 401. The other end of the resilient post 4022 is a hooked free end 4023. A lower portion C2 of the connection member 30 has a perforation 301 rotatably engaging with the tenon member 402 such that the connection member 30 is rotatable relative to the DVD player. The hooked free ends 4023 have a forwardly tapered shape so that they can easily enter the perforation 301. Since the hooked free ends 4023 hook on the wall edge 3011 after they enter the perforation 301, the resilient posts 4022 can be prevented from escaping from the perforation 301. On the other hand, an upper portion C1 of the connection member 30, which is integrally formed with the second portion C2, is securely coupled to the hanger assembly 20 via screw means. After the coupling mechanism is assembled completely, the assembly can be attached to the flat panel display with the hanger assembly 20 hooking on the edge of the flat panel display. When a user exerts a push or pull force on the DVD player, the tenon member 402 secured on the casing 40 of the DVD player will rotate inside the perforation 301 of the connection member 30 to carry the DVD player to rotate relative to the flat panel display without hindrance. In this manner, the disc entrance 41 of the DVD player 40 can differentially orient relative to the flat panel display.

Figure 4A:
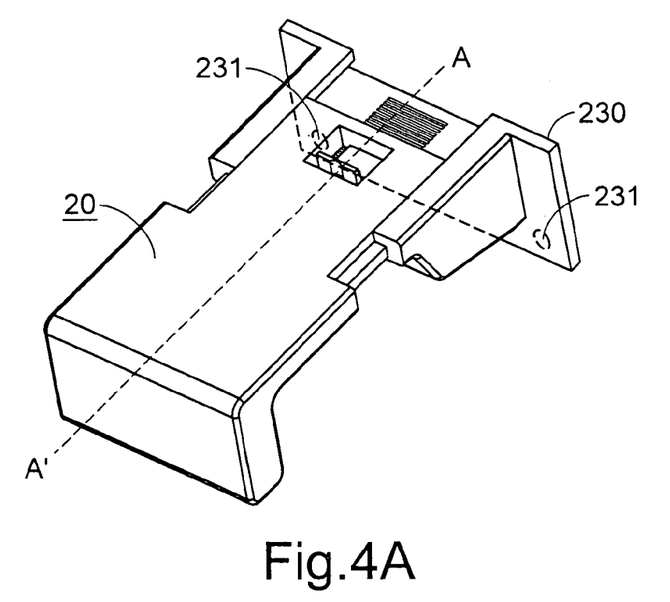
FIG. 4A is a schematic diagram showing a hanger assembly of the coupling mechanism according to an embodiment of the present invention.
Figure 4B:
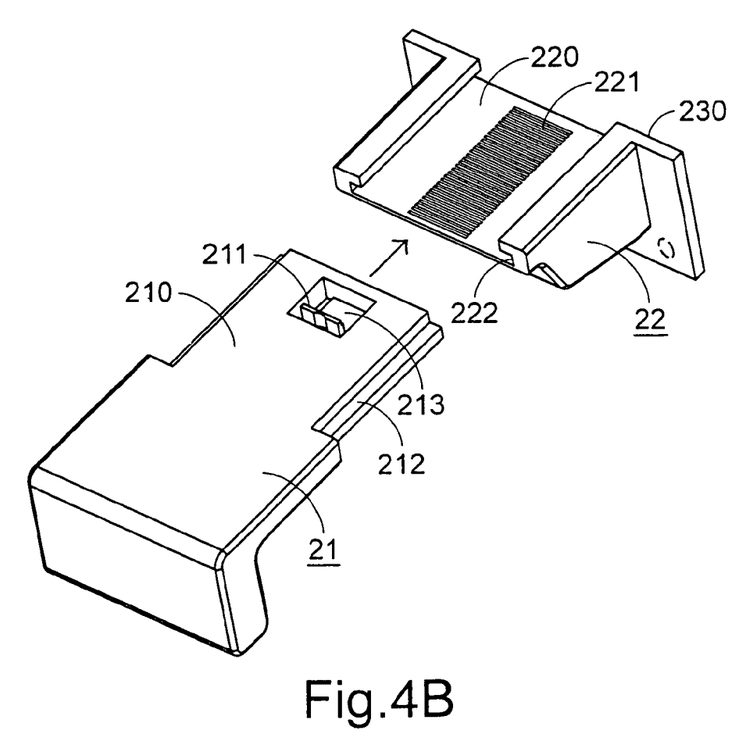
FIG. 4B is a schematic resolving diagram of the hanger assembly of FIG. 4A.
Figure 4C:
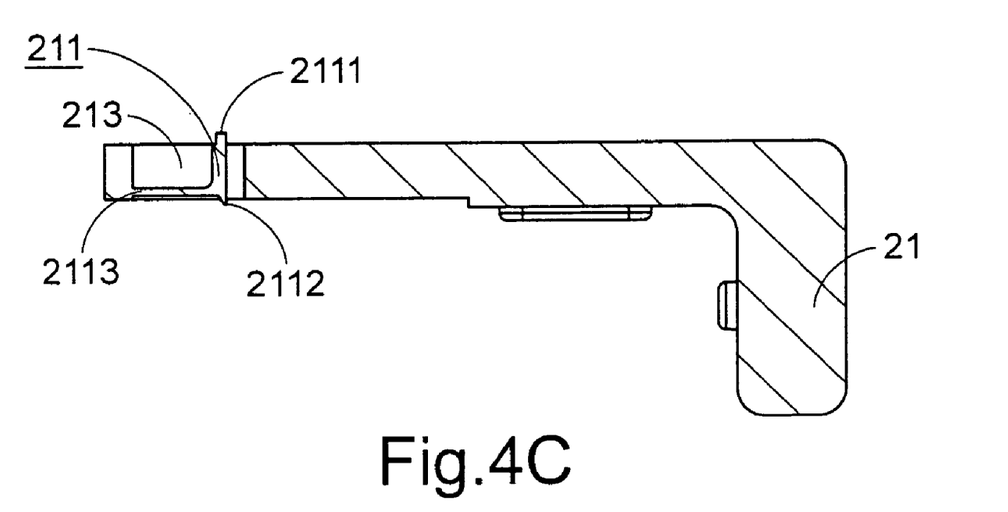
FIG. 4C is a schematic diagram showing en embodiment of the resilient structure of the hanger assembly of FIG. 4A.
Figure 4D:
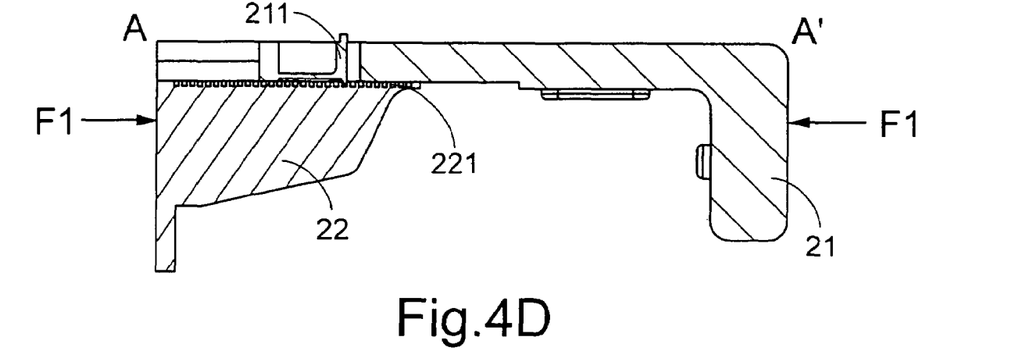
FIG. 4D is a schematic diagram showing a cross section of the hanger assembly of FIG. 4A taken along the line A-A', in which the saw-toothed structure and the resilient structure of the hanger assembly are in firm engagement with each other when a pushing force is applied to either of them.
Figure 4E:
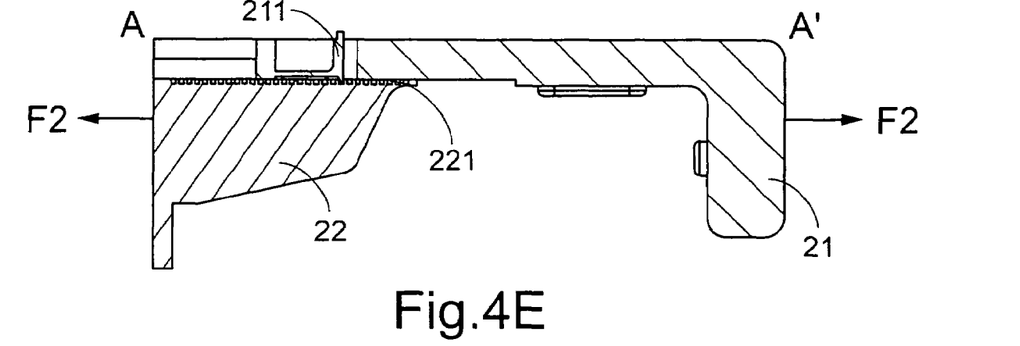
FIG. 4E is a schematic diagram showing a cross section of the hanger assembly of FIG. 4A taken along the line A-A', in which the saw-toothed structure and the resilient structure of the hanger assembly are in firm engagement with each other when a pulling force is applied to either of them.
Figure 4F:
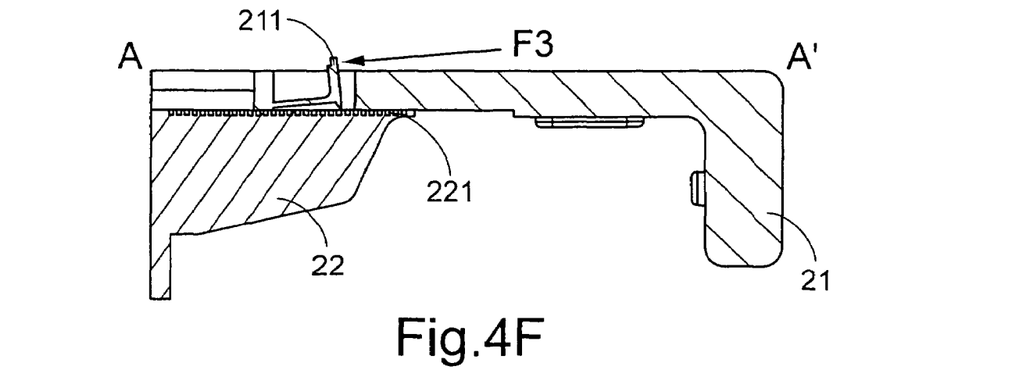
FIG. 4F is a schematic diagram showing a cross section of the hanger assembly of FIG. 4A taken along the line A-A', in which the saw-toothed structure and the resilient structure are movable relative to each other by exerting an external force on the resilient structure to disengage the resilient structure from the saw-toothed structure.

Please further refer to FIGS. 4A and 4B, which illustrate an embodiment of the hanger assembly 20. For complying with the thickness of the flat panel display, it is preferred that the length of the hook assembly (the width of the hook structure) is adjustable. The hook structure with adjustable length comprises a first separable portion 21 to be hook on the edge of the flat panel display and a second separable portion 22 to be secured to the connection member 30. The first separable portion 22 has a saw-toothed structure 221 on a top surface 220 thereof, a lateral trench structure 222, and two bolt holes 231 in a side-wall plate 230 thereof. The second separable portion 21 has a lateral protrusion structure 212 matching with the lateral trench structure 222 of the separable portion 22 in shape and size such that the lateral protrusion structure 212 can slide along the lateral trench structure 222. Via the bolt holes 231, the connection member 30 is screwed to the side-wall plate 230 of the hanger assembly 20. The second separable portion 21 has a through hole 213 on a top surface 210 thereof. In the through hole, a resilient structure 211 is arranged with one end 2111 protruding from the top surface 210, another end 2112 slightly extending down the bottom surface 214, and the other hand fixed on the wall of the though hole 213, as shown in FIG. 4C. The end 2112 is in firm engagement with the saw-toothed structure 221 of the separable portion 22, as shown in FIG. 4D or 4E, when there is no external force applied. Even when a pushing force F1 or pulling force F2 is applied to either of the separate portions 21 and 22, the trapping effect of the end 2112 in one of the tooth trench of the saw-toothed structure 221 avoids the readily relative movement between the separate portions 21 and 22. On the other hand, if an external force F3 is directly exerted on the exposed end 2111 of the resilient structure 211, the end 2112 of the resilient structure 211 will disengage from the saw-toothed structure 221 so as to release the first separable portion 22, as shown in FIG. 4F. Accordingly, the length of the hanger assembly 20 can be adjusted. When reaching the desired length, the external force F3 is removed, so the end 2112 of the resilient structure 211 becomes firmly engaging with the saw-toothed structure 221 of the first separable portion 22 again, thereby fixing the desired length of the hanger assembly 20. Conclusively, by disengaging the end 2112 of the resilient structure 211 from the saw-toothed structure 221 and sliding the lateral protrusion structure 212 along the lateral trench structure 222 back or forth, the extensive length of the hook structure can be adjusted to confirm to the shape and thickness of the flat panel display.

Figure 5A:
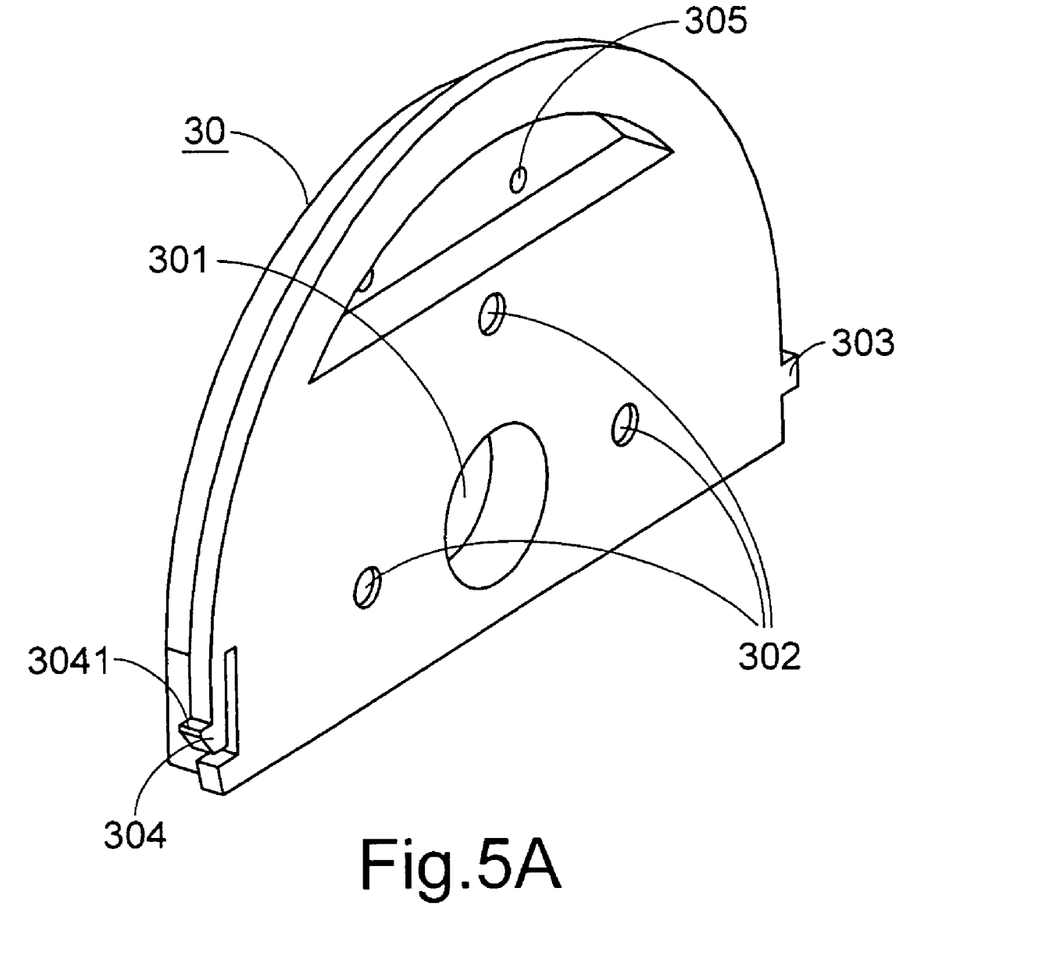
FIG. 5A is a schematic perspective view showing the back face of the connection member of FIG. 3A in contact with the DVD player.
Figure 5B:
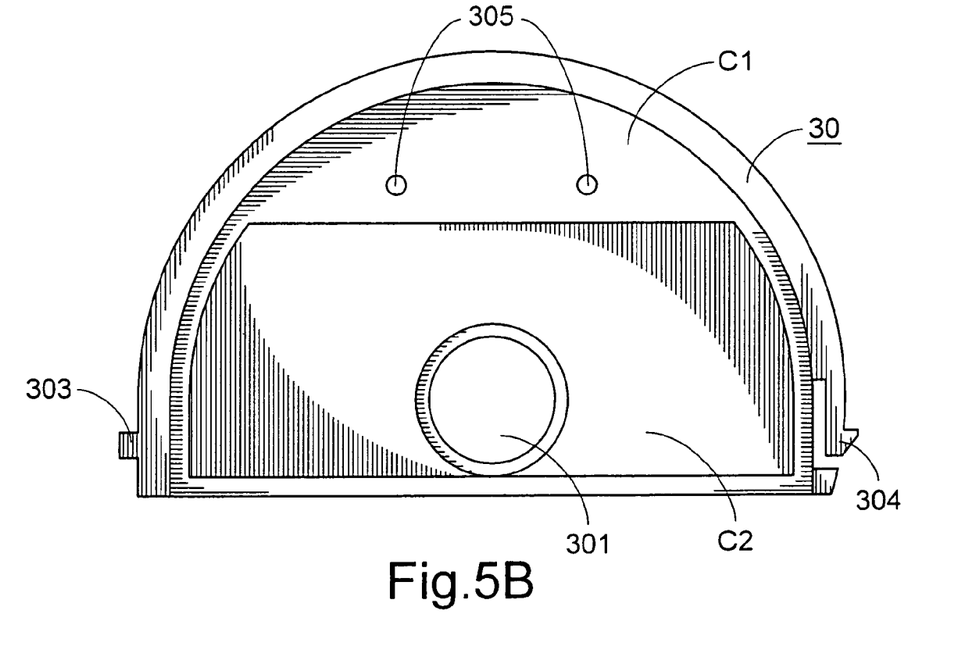
FIG. 5B is a schematic plane view showing the front face of the connection member of FIG. 3A in contact with the hanger assembly.
Figure 5C:
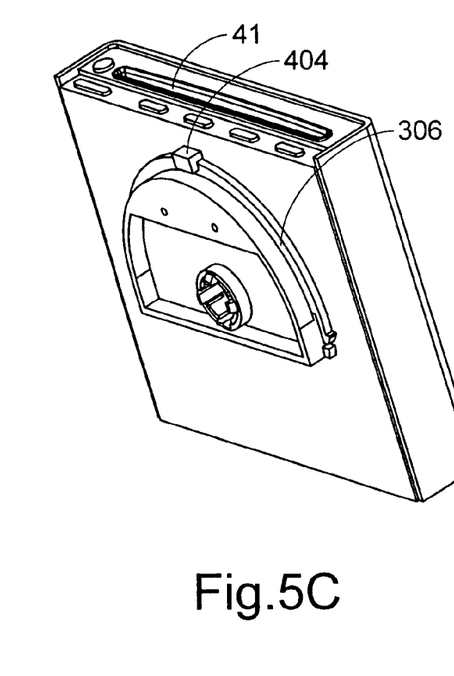
FIGS. 5C~5E are schematic diagrams showing three orientations of the DVD player according to the embodiment of FIG. 3B.
Figures 5D, 5E:
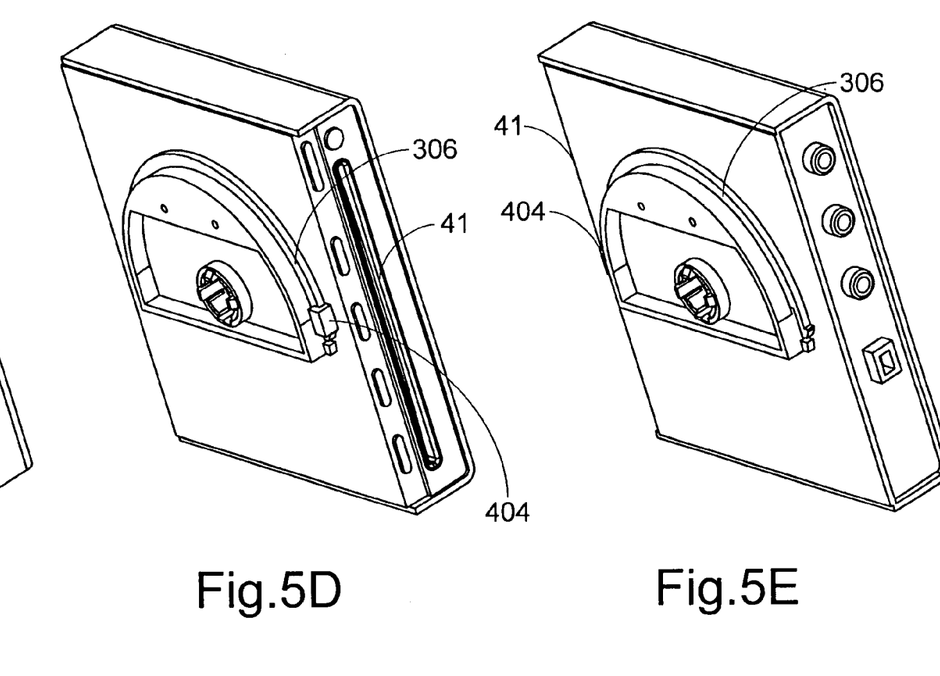

Pleas refer to FIGS. 5A~5B and also FIGS. 3A and 3B. As mentioned above, the upper portion C1 of the connection member 30 is coupled to the side-wall plate 230 of the hanger structure 20 via screw means. The screw means includes two sets of screw bolts 31 and nuts 32. After the screw bolts 31 penetrate through respective openings 305 in the connection member 30 and bolt holes 231 in the hanger assembly 20, and are locked with the nuts 32, the connection member 30 is screwed to the side-wall plate 230 of the hanger assembly 20. In the lower portion C2 of the connection member 30, in addition to the perforation 301, a plurality of retaining holes 302 and a protruding edge 306 are further provided. After the tenon member 402 penetrates through the perforation 301 and serves as a rotating shaft as mentioned above, a hook structure 404 disposed on the casing 40 of the DVD player movably receives therein the protruding edge 306 of the connection member 30. The hook structure 404 slides through the elongated protruding edge 306 when the tenon member 402 rotates inside the perforation 301. In the protruding edge 306, a first stop block 303 and a second stop block 304 are arranged at opposite ends thereof. The first stop block 303 stops the hook structure 404 from escaping from one end of the protruding edge 306. The second stop block 304 has a resilient hooked free end 3041. The resilient hooked free end 3041 has a tapered structure allowing the hook structure 404 to enter and hook on the protruding edge 306 from this end but stops the hook structure 404 from escaping from the protruding edge 306. The retaining holes 302 are discretely arranged around the perforation 301 for selectively engaging with a salient 405 disposed on the casing 40 of the DVD player (see FIG. 3A). Once the orientation of the DVD player 40 relative to the flat panel display has been determined, the relative positions of the connection member 30 and back surface 401 of the DVD player 40 should be fixed. By providing three retaining holes 302, three kinds of orientation of the DVD player relative to the flat panel display can be selected. The examples are shown in FIGS. 5C~5E, wherein the three retaining holes 302 selectively engage with the salient 405 to have the disc entrances 41 of the DVD players face upwards, rightwards and leftwards, respectively. Of course, the number and positions of the retaining holes can be chosen depending on desired orientation change levels.

Figure 6A:
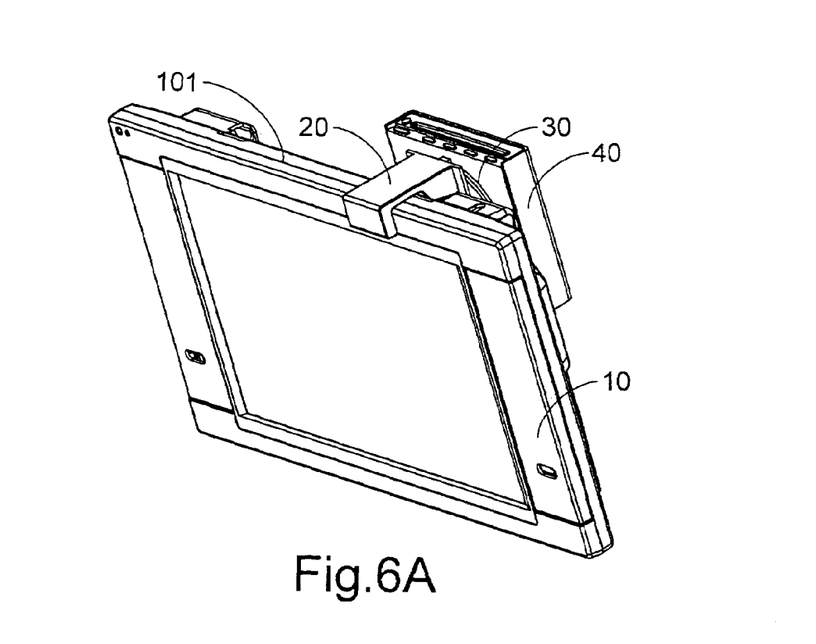
FIGS. 6A~6C are schematic perspective, front and side views showing the coupling configuration of the assembly of FIG. 3B to a flat panel display, respectively.
Figure 6B:
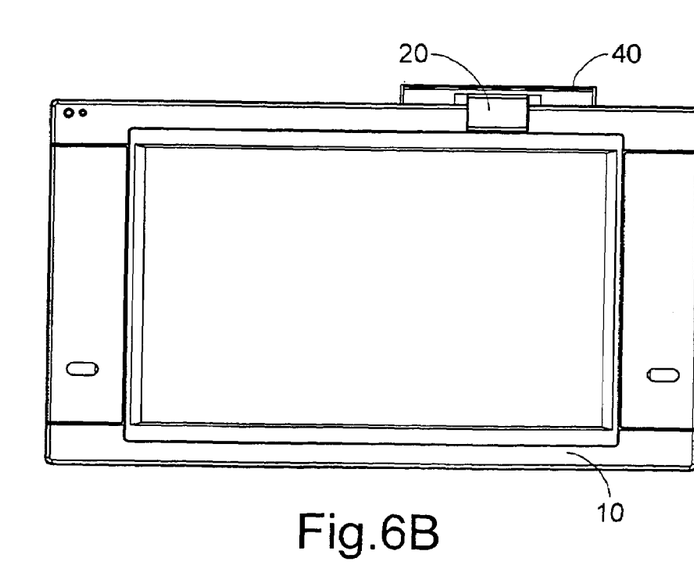
Figure 6C:
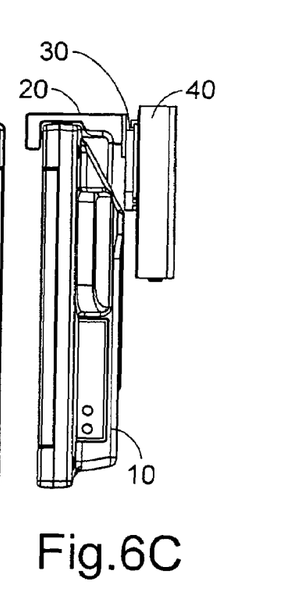

Referring to FIGS. 6A~6C, when the hook structure of the hanger assembly 20 hooks on a top edge 101 of a flat panel display 10, the DVD player 40 is attached onto the flat panel display 10 and capable of adjusting orientation thereof via the coupling mechanism 30 to facilitate insertion/ejection operation in a manner mentioned above.

Figure 7A:
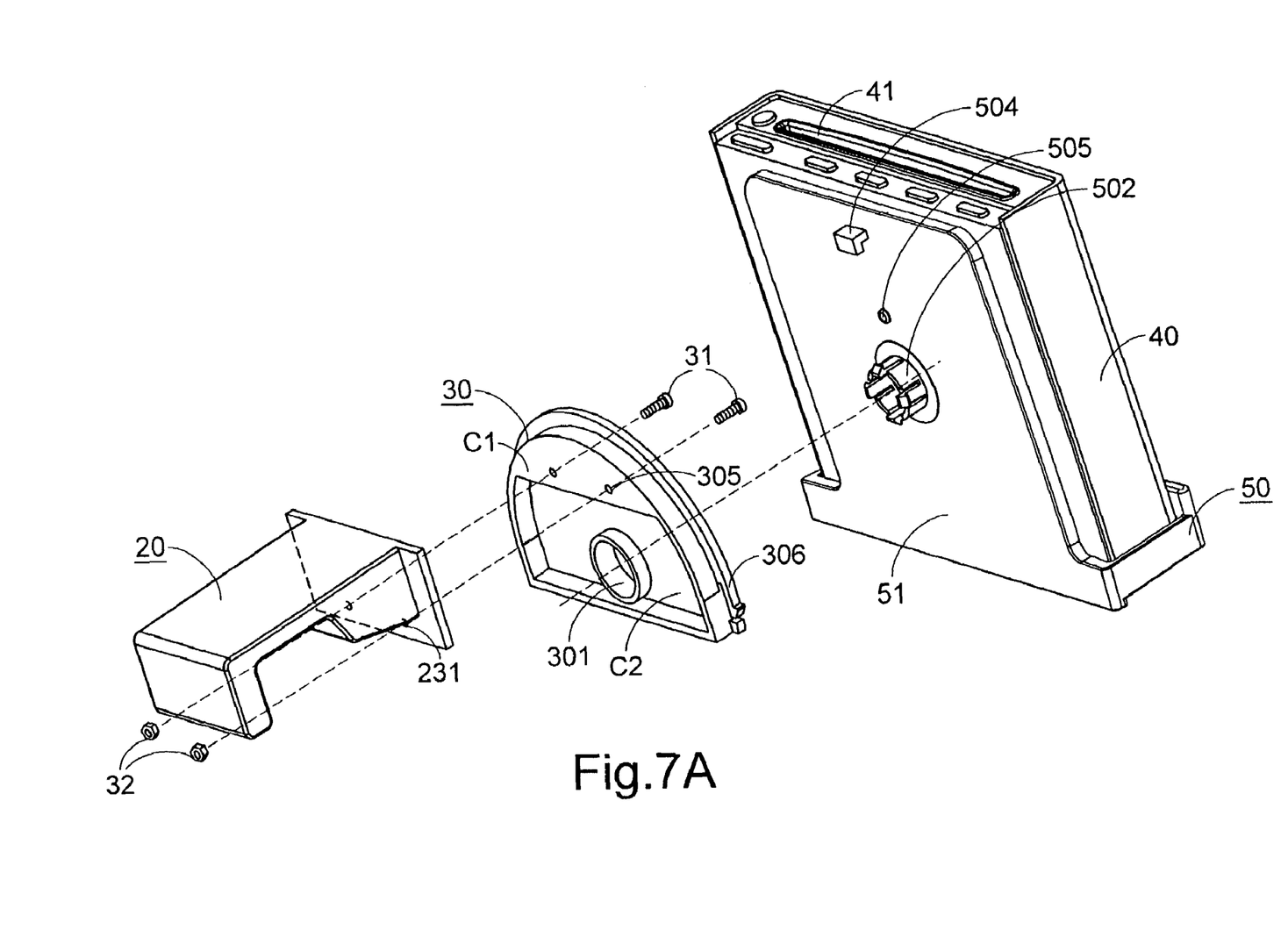
FIG. 7A is a schematic resolving diagram showing another embodiment of a coupling mechanism according to the present invention.
Figure 7B:
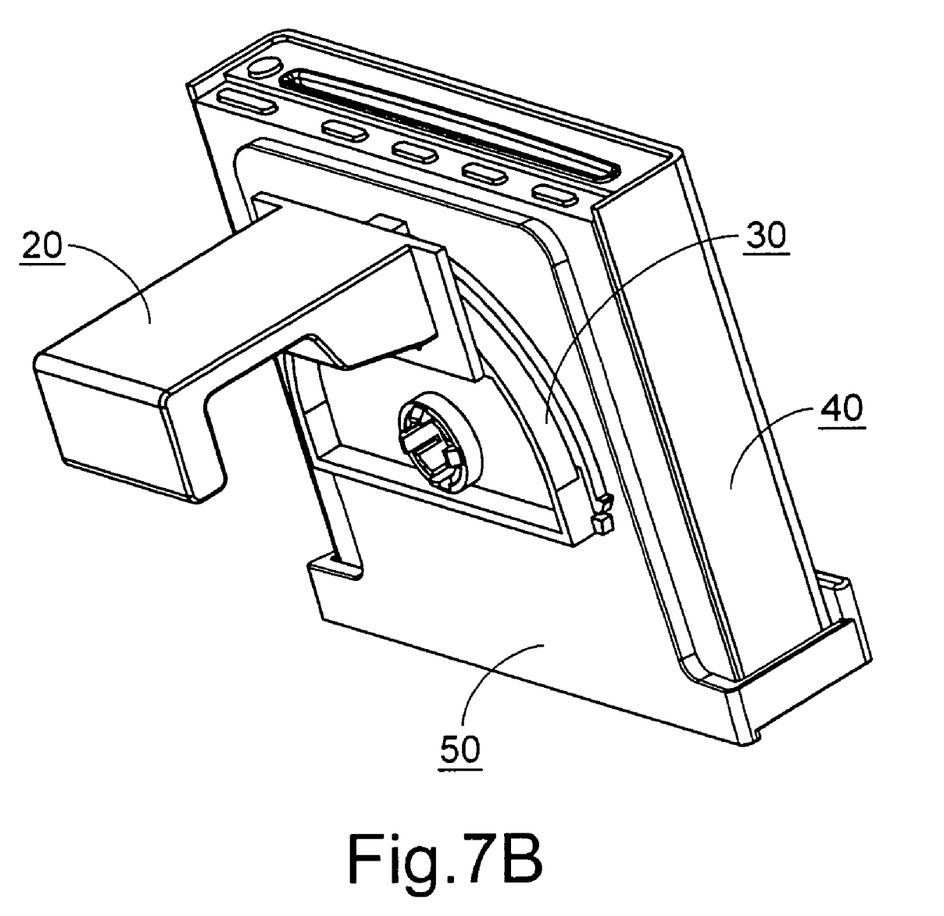
FIG. 7B is a schematic assembled diagram of the coupling mechanism of FIG. 7A.

A further embodiment of a coupling mechanism is illustrated in FIGS. 7A and 7B, wherein the DVD player 40 is put inside a chassis 50 and clamped between side pates 51. In this embodiment, the hanger assembly 20 and the connection member 30 are similar to those shown in FIG. 3, and a tenon member 502, a hook structure 504 and a salient 505, which have functions similar to the elements 402, 404 and 405 in FIGS. 3A and 3B, are disposed on the back surface of the chassis 50, i.e. the side plate 51. One or more of the side plates 51 and bottom plate can be made hollow to facilitate heat dissipation during operation of the DVD player 40. It is to be noted that the chassis 50 should be designed to allow the DVD player 40 disposed stably therein. It is preferred an additional holding member (not shown) is provided to stop the DVD player from falling when the DVD player rotates to change orientation.

It is understood from the above description that the coupling mechanism according to the present invention secures the audio/video player behind the flat panel displayer in uptight configuration so that much desk space would be saved. The space utilization is largely improved. Furthermore, since the orientation of the audio/video player relative to the flat panel display is adjustable, the insertion/ejection operation is convenient and flexible.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A coupling mechanism for securing an audio/video player onto a flat panel display, comprising:
   a casing for supporting said audio/video player in an upright manner;
   a hanger assembly attachable to said flat panel display, wherein said hanger has a hook structure and said hook structure has a first separable portion with a lateral trench structure and a second separable portion with a lateral protrusion structure matching with said lateral trench structure, wherein said first and second separable portions of said hook structure further have saw-toothed and resilient structures movably engaging with each other when said lateral protrusion structure slides along said lateral trench structure, thereby allowing an extensive length of said hook structure to be adjusted according to the thickness of said flat panel display; and
   a connection member for rotatably coupling said casing to said hanger assembly so that an orientation of said audio/video player relative to said flat panel display is adjustable.

2. The coupling mechanism according to claim 1 wherein said connection member is securely coupled to said hanger assembly by a first portion thereof and rotatably coupled to said casing by a second portion thereof.

3. The coupling mechanism according to claim 2 wherein said first portion of said connection member is screwed to a side wall of said hanger assembly.

4. The coupling mechanism according to claim 2 wherein said second portion of said connection member has a first fixture element rotatably engaging with a second fixture element arranged on said casing.

5. The coupling mechanism according to claim 4 wherein said first portion and said second portion of said connection member are integrally formed so that said first portion and said hanger assembly rotate with said second portion when said first fixture element rotates relative to said second fixture element, thereby orienting said audio/video player differentially relative to said flat panel display.

6. The coupling mechanism according to claim 4 wherein said first fixture element is a perforation created in said second portion, and said second fixture element is a tenon member with a hook structure for hooking on a wall edge of said perforation so as to retain said flexible post member inside said perforation.

7. The coupling mechanism according to claim 6 wherein said tenon member includes a plurality of rigid posts and resilient posts alternately arranged and protruding from a surface of said casing in parallel, and each of said resilient posts has one end fixed on said casing and the other end being a hooked free end.

8. The coupling mechanism according to claim 6 wherein said connection member further comprises a plurality of retaining holes discretely arranged around said perforation for selectively engaging with a salient arranged on said casing so as to secure relative positions of said connection member and said casing once said orientation of said audio/video player relative to said flat panel display has been determined.

9. The coupling mechanism according to claim 4 wherein said casing further comprises a hook structure disposed at the same side as said second fixture element and matching with a protruding edge of said connection member, and said protruding edge is elongated and sliding through said hook structure when said first fixture element rotates relative to said second fixture element.

10. The coupling mechanism according to claim 9 wherein said protruding edge of said connection member comprises:
    a first stop block disposed at a first end thereof for stopping said hook structure from escaping from said first end of said protruding edge; and
    a second stop block disposed at a second end thereof and having a resilient hooked free end,
    wherein a tapered structure of said resilient hooked free end allows said hook structure of said casing to hook on said protruding edge from said second end but stops said hook structure from escaping from said second end of said protruding edge.

11. The coupling mechanism according to claim 1 wherein said casing includes a chassis and a plurality of side plates extending from said chassis and forming a room therebetween for receiving said audio/video player.

12. The coupling mechanism according to claim 1 wherein said casing is a housing of said audio/video player.

13. A coupling mechanism for mounting an audio/video player to a flat panel display, comprising:
    a casing for supporting said audio/video player in an upright manner;
    a hanger assembly having a hook structure for hooking on an edge of said flat panel display, said hook structure comprising first and second separable portions having first and second engaging elements movably engaging with each other to allow an extensive length of said hook structure to be adjusted according to the thickness of said flat panel display, wherein said first and second engaging elements are saw-toothed and resilient structures, respectively; and
    a connection member for rotatably coupling said casing to said hanger assembly so that an orientation of said audio/video player relative to said flat panel display is adjustable.

14. The coupling mechanism according to claim 13 wherein said connection member has a first fixture element rotatably engaging with a second fixture element arranged on said casing.

15. The coupling mechanism according to claim 14 wherein said first fixture element is a perforation, and said second fixture element is a tenon member with another hook structure for hooking on a wall edge of said perforation.

16. The coupling mechanism according to claim 15 wherein said connection member further comprises a plurality of retaining holes discretely arranged around said perforation for selectively engaging with a salient arranged on said casing so as to secure relative positions of said connection member and said casing once said orientation of said audio/video player relative to said flat panel display has been determined.

17. A coupling mechanism for securing an audio/video player onto a flat panel display, comprising:
    a casing for supporting said audio/video player in an upright manner;
    a hanger assembly attachable to said flat panel display; and
    a connection member for rotatably coupling said casing to said hanger assembly so that an orientation of said audio/video player relative to said flat panel display is adjustable,
    wherein said connection member is coupled to said hanger assembly by a first portion thereof and rotatably coupled to said casing by a second portion thereof, wherein said second portion of said connection member has a first fixture element rotatably engaging with a second fixture element arranged on said casing,
    wherein said first portion and said second portion of said connection member are integrally formed so that said first portion and said hanger assembly rotate with said second portion when said first fixture element rotates relative to said second fixture element, thereby orienting said audio/video player differentially relative to said flat panel display.

18. A coupling mechanism for securing an audio/video player onto a flat panel display, comprising:
   a casing for supporting said audio/video player in an upright manner;
   a hanger assembly attachable to said flat panel display; and
   a connection member for rotatably coupling said casing to said hanger assembly so that an orientation of said audio/video player relative to said flat panel display is adjustable,
   wherein said connection member is securely coupled to said hanger assembly by a first portion thereof and rotatably coupled to said casing by a second portion thereof, wherein said second portion of said connection member has a first fixture element rotatably engaging with a second fixture element arranged on said casing,
   wherein said casing further comprises a hook structure disposed at the same side as said second fixture element and matching with a protruding edge of said connection member, and said protruding edge is elongated and sliding through said hook structure when said first fixture element rotates relative to said second fixture element.

* * * * *